United States Patent [19]

Czulak et al.

[11] 4,415,594

[45] Nov. 15, 1983

[54] MANUFACTURE OF CHEESE

[75] Inventors: Jozeph Czulak, South Yarra; Leslie A. Hammond, Beaumaris, both of Australia

[73] Assignee: Australian Diary Corporation, Melbourne, Australia

[21] Appl. No.: 335,495

[22] Filed: Dec. 30, 1981

[30] Foreign Application Priority Data

Feb. 6, 1981 [AU] Australia .......................... PE7502/81

[51] Int. Cl.³ .................. A23C 19/032; A23C 19/045; A23C 19/072
[52] U.S. Cl. .......................................... 426/36; 426/38
[58] Field of Search ........................ 426/36, 38, 39, 40

[56] References Cited

U.S. PATENT DOCUMENTS 3,175,915  3/1965  Murphy .............................. 426/36
3,875,305  4/1975  Storrs ................................ 426/36 X

FOREIGN PATENT DOCUMENTS 160811  12/1954  Australia .

OTHER PUBLICATIONS

Wilson et al., American Cheese Varieties, Chas. Peizer & Co. Inc., N.Y., vol. II, 1965, (pp. 20-23).
Kosikowski, F., Cheese and Fermented Milk Foods, published by the Author, Ithaca, N.Y., 1966, (pp. 75-77 and 219).

*Primary Examiner*—David M. Naff
*Attorney, Agent, or Firm*—Sughrue, Mion, Zinn, Macpeak, and Seas

[57] ABSTRACT

In a traditional process of making Cheddar and similar varieties of cheeses comprising adding a starter to milk, cutting the curd, stirring the curd and whey, effecting a first cooking of the curd and whey, draining off some of the whey and effecting a second cooking, draining off the residual whey, cutting into pieces, salting, stirring and forming into blocks; an improvement is disclosed wherein the time for which the curd-whey mixture is maintained at a constant temperature following the first cooking is extended from 10 to 25 minutes and the time for which the curd-whey mixture is maintained at a constant temperature following the second cooking is extended from 10-20 minutes to 25 minutes. The process enables one to obtain the optimal level of lactose, lactic acid, calcium, phosphorus and pH of the curd at the critical point (separation) and the desired pH and buffering capacity in the finished cheese.

6 Claims, 1 Drawing Figure

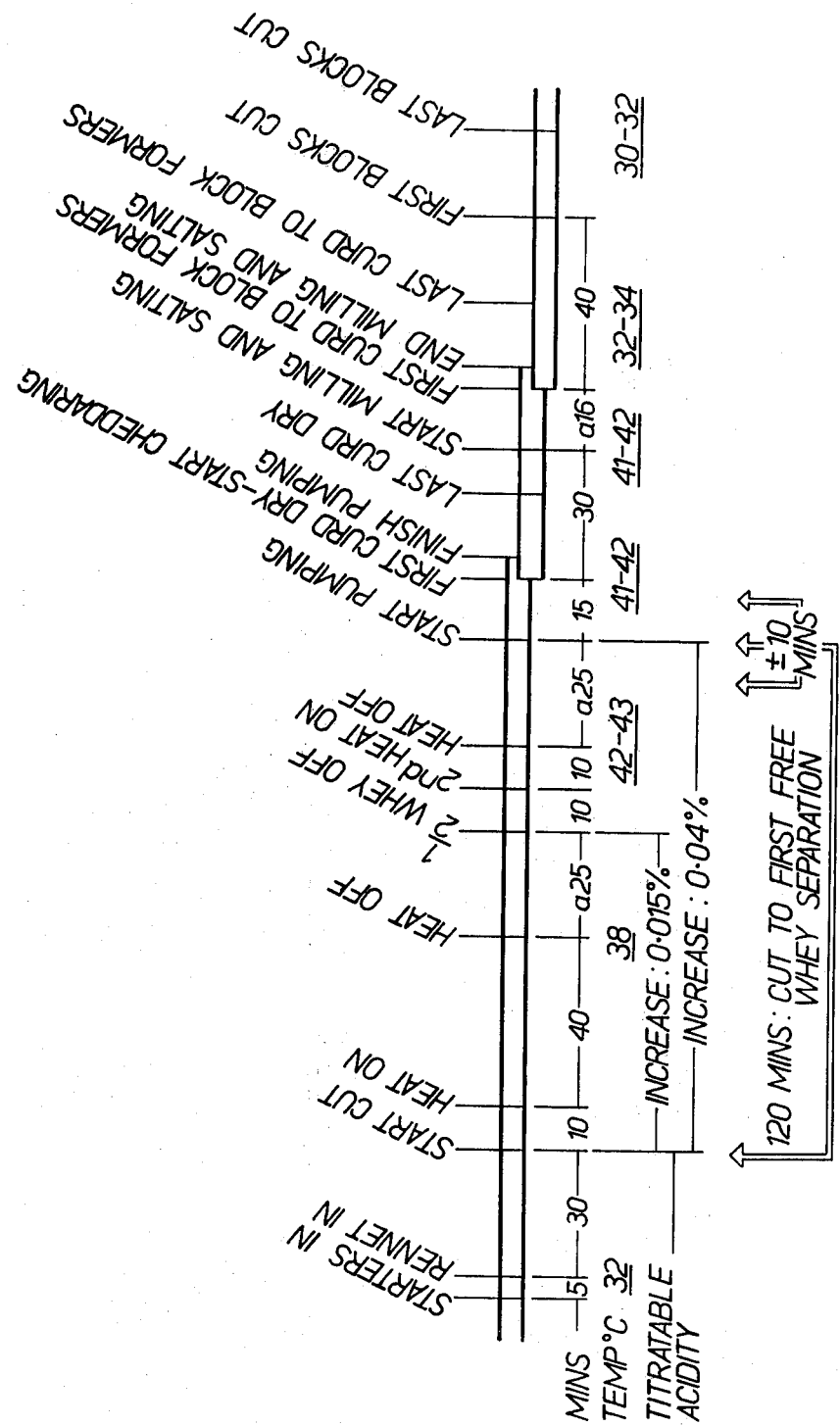

MANUFACTURE OF CHEESE

This invention relates to an improved process for the manufacture of cheese. The invention is particularly concerned with the manufacture of cheddar cheese but is also applicable, as described hereinafter, to the production of other types of cheese.

The invention is concerned with improvements and modifications of the process described in Australian Pat. No. 160,811, the full disclosure of which is incorporated herein by this reference. That process in turn represented an advance over the traditional methods of making cheese, particularly cheddar cheese. Patent No. 160,811 describes a process of making cheddar cheese in which a starter which is tolerant to heat is added to the milk together with one or more less heat-tolerant starters. The resulting curd when firm is cut and stirred with the whey and cooked by raising the temperature gradually to about 100° F. (38° C.) as in the traditional process, after which about one half of the whey is drained off and the temperature of the residual whey and of the curd is then raised to a temperature between about 105° and 120° F. (40° to 49° C.), a second cooking being thus effected. The residual whey is then drained from the curd in the vat and the curd is cheddared in the vat and after such cheddaring, in treated at temperatures (initially the temperature of the second cooking) which are 5°–20° F. (3° to 11° C.) higher than in the traditional process but otherwise in accordance with that process by cutting into strips or other larger particles, salting, stirring, putting into hoops and pressing.

The process of Patent No. 160,811 was effective in the manufacture of cheddar cheese but because of the shorter dwell time of the curd in the whey, the higher "cooking" temperatures and, consequently, the greater plasticity of the curd, some quality problems in the final product became apparent. These problems fell mainly in two areas:

(1) The uncertainty as to the final pH of the cheese and (2) The greater incidence of mechanical openness in the cheese, i.e., irregularly shaped voids in the body of the cheese.

Because of the greater incidence of flavour defects and to some extent body defects related to the pH of the cheese and the mechanical openness, the process of Patent No. 160,811, after some initial success, fell into disuse. Despite this the earlier process had proven advantages. The shorter processing times involved allowed a given throughput to be achieved with smaller sized equipment than for the traditional process, with accompanying labour savings. Additionally the process gave a greater measure of control of moisture content in the curd due to the higher "cooking" temperatures.

These factors prompted us to make a further study of the process in relation to the optimal parameters and critical factors in the process bearing on the quality of the final cheese product. The aim of this study, and an object of the present invention, was to define modifications to the earlier process which would eliminate or at least minimise the abovementioned defects and thereby further improve the process and to render it more amenable to, and more attractive for, mechanisation and automation.

With these objectives in view, we carried out a series of small scale cheddar cheese manufacturing trials, using the traditional cheese making process and based on the following rationale.

EFFECT OF pH ON CHEESE QUALITY

It had been known previously that the pH of the curd at the time of separation of the curd from the free whey had a significant bearing on the final pH of the cheese but that the correlation lacked consistency and therefore reliability. We therefore investigated the chemical equilibria in the early phase of the process when the curd is in contact with, i.e., is suspended in, the free whey. On theoretical considerations, we chose to examine the levels of lactose, lactic acid, pH, calcium and phosphorus in the curd and in the whey in the period between the cutting of the curd and the separation of the free whey from the curd. We also examined the effect of these parameters on the final pH of the cheese and related it to the flavour and body characteristics of the cheese.

From these investigations we derived the following information.

(a) As the fermentation of the lactose by the lactic bacteria proceeds, the level of lactic acid in the curd increases and remains higher there than in the whey. This is because most of the lactic baterial population remains trapped in the curd. The lactic acid formed in the curd slowly diffuses into the whey.

(b) Although the level of lactic acid in the curd is higher because of the greater buffer capacity there, the pH in the curd, while dropping with time, remains continuously higher than the pH in the surrounding whey. There is an almost constant correlation between the two values, so that for practical control purposes it would be sufficient to measure only the pH levels in the whey or, alternatively, the titratable acid levels in the whey.

(c) Because of the greater fermentation activity in the curd, the level of lactose in the curd is lower than in the whey but the lactose used up in the curd is substantially replaced by diffusion of lactose from the whey. The effect of this diffusion is that the more acidity there is produced in the curd, the more substrate for further fermentation is provided and, hence, on completion of the fermentation in the cheese the pH there will drop significantly below the expected desirable level.

(d) As the pH in the curd continues to drop, the colloidal calcium and phosphorus compounds in the curd become progressively more soluble and diffuse into the surrounding whey, where their level is consistently lower. The calicum ions diffuse faster than the phosphate ions. Excessive loss of calcium from the curd leads to poorer bonding in the curd during subsequent cheddaring and short and brittle body in the cheese. Excessive loss of phosphate from the curd reduces substantially the buffering capacity in the cheese which, in turn, depresses the rate of fermentation of the residual lactose in the cheese, thereby causing the fall of the pH to the ultimate level in the cheese to be delayed by up to two months during maturing.

(e) There is a definite correlation between the rate of lactose fermentation and the levels of pH in the curd, the residual lactose in the curd, the levels of calcium and phosphate in the curd and the final pH and buffering capacity in the cheese and, hence, the ultimate quality of the cheese. This can be stated as a rule: if the fermentation rate is too high, the lactic acid in the curd has insufficient time to diffuse into the whey whereby residual acidity in the curd will be too high and the final pH in the cheese too low, giving rise to consequent sour and bitter flavour. The colour of the cheese will be somewhat bleached and the body somewhat soft or pasty.

When the rate of fermentation is too slow more of the lactose used up in the curd is replaced by diffusion into the curd and this results in a high residual lactose level in the cheese. When this lactose is ultimately, though slowly fermented, the pH of the cheese will fall too far. The slow rate of acid production in the curd allows excessive leaching of calcium and phosphorous from the curd with the results already described under (d) above. Consequently, the cheese will also have a sour and bitter flavour, a short and brittle body and a bleached appearance.

(f) From the above observations, it became clear to us that to control the important variables investigated and discussed above, the optimal rate of lactose fermentation would have to be established. Furthermore the optimum time of contact of the curd with the free whey would also have to be determined and fixed because, in spite of the different rates of diffusion, this would also fix the levels of lactic acid, lactose, calcium and phosphate at the time of curd separation and hence, the ultimate pH and buffering capacity of the cheese and its related quality characteristics. In series of small scale manufacturing trials we found that the rate of lactose fermentation in the curd should be such that the pH of the whey, the period between the cutting of the curd and the start of free whey separation, should fall from about 6.3 to about 6.00 in 120 minutes ±10 minutes. The pH of the curd would then be close to 6.15, the residual lactose in the curd water close to 4.7%, the lactic acid in the curd water close to 0.165%, calcium content in the whey close to 0.80 mg/ml and phosphorus content in the whey close to 0.40 mg/ml. The pH of the resultant cheese after three weeks aging is in the range of 5.1 to 5.3 (the preferred level for Australian cheddar cheese) and its buffering capacity equivalent to 10 ml of 0.05 N NaOH per 50 ml of cheese extract with distilled water to shift the pH from 5.50 to 7.40 in the extract.

Having obtained these critical parameters we then tested their validity by a series of experiments based on the process described in Australian Patent No. 160,811. In that process as originally described, no adequate information was given concerning the rate of acid development in the critical phase of curd treatment, i.e., while the curd remains in contact with the free whey. The pH levels at the time of whey separation were not discussed and, as we have since found, the time of contact of the curd with the free whey as indicated in the patent specification was too short by about 20 minutes for optimal levels of lactose, lactic acid, pH, calcium and phosphorus to be attained in the curd.

In a series of small scale manufacturing trials we therefore modified the process of the patent by adjusting the rate of lactose fermentation so that a pH of about 6.00 in the whey (6.15 in the curd) was reached in about 120 minutes from the cutting of the curd to the start of separation of the curd from the free whey. Thus the time of contact of the curd with the free whey was extended to 120 minutes compared to the 100 minutes originally stated in the patent specification.

This extension of the contact time was effected by holding the curd for 25 minutes instead of 10 minutes on completion of the first cooking (to 38° C.) and for 25 minutes instead of 10 to 20 minutes after the completion of the second cooking and before the start of separation of curd from the free whey. We found that by doing this we were able to obtain the optimal level of lactose, lactic acid, calcium, phosphorus and pH in the curd at the critical point (separation) and the desired pH and buffering capacity in the finished cheese. The cheese prepared by the improved process was of consistently good quality.

Thus, in accordance with one aspect of the present invention, the process described in Patent No. 160,181 is modified so that a pH of 6.00 in the whey is reached in about 120 minutes ±10 minutes from the cutting of the curd to the start of separation of the curd from the free whey.

We have also found that the rate of lactose fermentation could be controlled by varying the rate of addition of the normal cheese starter culture and the heat resistant culture to the milk at the beginning of the process.

More specifically, in accordance with the present invention, there is provided a process of making cheddar cheese, in which *Streptococcus thermophilus* is added to milk together with one or more of *Streptococcus lactis, Streptococcus cremoris* and *Streptococcus diacetilactis*, the resultant curd when firm being cut and stirred with the whey and cooked by raising the temperature gradually to about 38° C. over a period of about thirty five to forty five minutes and maintaining that temperature for about 25 minutes as in the traditional process, and in which about one half of the whey is then drained off and the temperature of the residual whey and of the curd is then raise over a period of about ten minutes to a temperature between about 40° and 49° C. for about 25 minutes, a second cooking being thus effected, and in which the residual whey is then drained from the curd in the vat and the curd is cheddared in the vat at this higher temperature for about half an hour and, after such cheddaring, is treated at temperatures (initially the temperature of the second cooking) which are about 3° to 11° C. higher than in the traditional process but otherwise in accordance with that process by cutting into srips or other large particles, salting, stirring, putting into hoops and pressing.

MECHANICAL OPENNESS IN THE CHEESE

Our investigations indicated that the main cause of mechanical openness in the cheese is the inclusion of air in the curd during its compression.

We therefore concluded on theoretical grounds that the higher incidence of mechanical openness of the cheese made by the patented process, could result from the higher plasticity of the curd at that stage due to it being at a higher temperature compared to curd made by the traditional process. We considered that such higher plasticity would induce the curd to fuse very rapidly on the outside of the mass being compressed thus sealing off escape outlets for entrapped air from the mass during compression.

This assumption was tested by applying vacuum prior to and during the compression of the warm curd to evacuate air from the cheese hoop. We found that this treatment resulted in either a complete absence of mechanical openness or a reduction of such defects below a significant level.

We also found that the plasticity of the curd could be reduced by allowing it to cool to about 31° to 35° C. before compression. This treatment also effectively reduced the mechanical openness in the cheese to an acceptable level.

We further found with either the vacuum or cooling treatments, a closer texture was more likely to be obtained if the curd was allowed to remain loose for about 15 minutes after salting and prior to compression, thereby to allow the whey expelled from the curd in response to salt, to separate and drain away and avoid the entrapment of pockets of whey in the curd mass during compression.

Thus, in accordance with a further aspect of the present invention, pressing of the curd is carried out under reduced pressure, and/or after cooling to about 31° to 35° C. and/or after allowing the curd to stand after salting for about 15 minutes.

By modifying the process of Patent No. 160,811 in the manner described above, we were able to eliminate the causes of cheese quality defects inherent in the original form of the process. In so doing we have defined the important critical parameters of the process and this information permits much better control of the quality of the resultant product.

The above-described improvement to the original process give the latter a greater measure of potential commercial acceptance and also render the process more amenable to mechanisation and automation in either batch or continuous systems.

In searching for a remedy for the effects of inadvertent rapid acid development as discussed above, we found that it was possible to correct the excessive levels of acidity in the curd in the case of too rapid acid development by withdrawing part of the whey, replacing it with water at the same temperature and stirring the curd-whey-water mixture for five minutes prior to the start of whey separation. This treatment results in extraction from the curd of lactic acid and lactose and thereby prevents too low pH in the finished product.

This observation prompted us to test the possibility of using deliberate dilution of the whey as a means for producing cheese varieties other than cheddar by the present process. We found that by reducing the second cooking temperature to about 40–47° C. and by replacing up to about 30% of the whey with warm water in the manner described above, we could successfully produce at will cheese with higher moisture content and higher pH and, therefore, with softer body and sweeter flavour.

Furthermore, we found that by using in addition to the normal lactic starter culture and the heat-tolerant culture, a small quantity (e.g., 0.1%) of a carbon dioxide and diacetyl-producing culture, a cheese close to resembling Edam, Gouda or Samso varieties could be readily produced. Suitable culture additions are *Leuconostoc citrovorum* or *S. diacetylactis.*

This latter finding is of economic importance because these other varieties of cheese can be produced by simple variation of the process while retaining the same mechanised and automated systems as are used for the cheddar process.

The invention is further illustrated by reference to the accompanying drawing which shows a typical schedule for operating a continuous mechanized cheese-making plant in accordance with the teachings of the invention. The stated times for the various steps will vary somewhat with different types of plant, but the period of 120±10 minutes time span between "start cut" and "start pump" (whey removal) must be observed to achieve the benefits of the invention.

EXAMPLE

Cheddar cheese was made by the procedure illustrated in the accompanying drawing. 10,000 liters of whole milk was adjusted by removal of excess butterfat so that the finished cheese would conform to the standard for Cheddar cheese. The milk was pasteurised at 72° C. for 15 seconds and cooled to 32° C.

A clotted skimmed milk culture of a mesophilic starter strain comprising a blend of *Streptococcus lactis* and *Streptococcus cremoris* was added to the milk at the rate of 2% by volume. The equivalent of 1% by volume of a thermophilic starter, *Streptococcus thermophilus,* was also added. Sufficient calf rennet was added to set the milk in 30 minutes.

The coagulum was cut into cubes of 6–8 mm and agitated slowly for 10 minutes. The vat contents were then heated from 32° to 38° C. over a period of 40 minutes and held for a further 25 minutes by which time the titratable acidity of the whey had increased by 0.015% from when the first free whey was released from the curd after cutting. The speed of the agitators was gradually increased during this period as the curd firmed.

The agitators were stopped and whey equal to half the vat contents was removed. Agitation was resumed and the speed increased still further. The vat contents were heated from 38° C. to 43° C. within 20 minutes of starting the half-whey-off step.

After 25 minutes when the titratable acidity had risen by 0.04% from the cutting acidity, the vat contents were pumped over a screen to separate the curd from the whey. The screened curd was subjected to intermittent dry stirring for 15 minutes and allowed to continue draining.

The "dry" curd was allowed to settle and consolidate (cheddar) for 30 minutes before being milled into particles of about 10 m×12 m×60 mm.

Salt was added to the curd at the rate of 2.8% (weight for weight) and the curd allowed to stand with little agitation for 16 minutes to allow absorption of the salt and the release of whey. The cheese was then formed into 19 kg blocks under vacuum and packaged. Approximately 1,000 kg of cheese was produced.

The product resembled conventional cheddar cheese in all respects.

Note

Apart from the addition of a thermophilic starter, the procedure up to the point when the vat contents were subjected to a second "cook" followed that of the traditional process. At the higher cooking temperature lactic acid was produced in the curd by the thermophile while the activity of the mesophilic starter was inhibited.

At the higher cooking temperature of 43° C. cheddaring was accelerated. In the period between milling and forming blocks the temperature of the curd was allowed to fall to 32°–33° C. which is the usual temperature of traditional Cheddar curd at the stage of forming blocks.

Procedures for forming, packaging, handling and maturing the blocks was the same as for cheese made by the traditional method.

Those skilled in the art will appreciate that the invention described herein is susceptible to variations and modifications other than those specifically described. It is to be understood that the invention includes all such variations and modifications which fall within its spirit and scope.

We claim:

1. A process of making cheese comprising the steps of adding *Streptococcus thermophilus* together with one or more bacteria selected from the group consisting of *Streptococcus lactis, Streptococcus cremoris,* and *Streptococcus diacetilactis,* and rennet to milk to produce a coagulum, cutting the coagulum to produce a curd-whey mixture, stirring the curd-whey mixture and effecting a first cooking by raising the temperature gradually to about 38° C. over a period of 35 to 45 minutes and maintaining that temperature for about 25 minutes, draining off about one half of the whey and effecting a second cooking by raising the temperature of the residual whey and curd over a period of about 10 minutes to a temperature between 40° C. and 49° C. and maintaining that temperature for about 25 minutes, draining the residual whey from the curd and cheddaring the drained curd at a temperature between 40° C. and 49° C. for about 30 minutes, cutting the cheddared curd into large pieces and salting, stirring, and compressing the curd pieces into blocks.

2. A process of making cheese as set forth in claim 1 wherein the plasticity of the curd is reduced by allowing it to cool to about 31° C. to 35° C. before compression.

3. A process of making cheese as set forth in claim 2 wherein the compression of the curd is carried out under reduced pressure.

4. A process of making cheese as set forth in claim 1 wherein the curd is allowed to stand after salting for about 15 minutes.

5. A process of making cheese as set forth in claim 1 wherein following the second cooking, a positive amount up to about 30% of the whey is replaced with water of the same temperature and curd-whey-water mixture is stirred for 5 minutes prior to the start of whey separation.

6. A process of making cheese as set forth in claim 1 wherein about 0.1% carbon dioxide and diacetyl-producing culture are added with the starter.

* * * * *